United States Patent
Huang et al.

(10) Patent No.: US 11,575,311 B2
(45) Date of Patent: Feb. 7, 2023

(54) POWER QUALITY COMPENSATOR DEVICE AND CONTROL METHOD THEREOF

(71) Applicant: Delta Electronics, Inc., Taoyuan (TW)

(72) Inventors: Heng Huang, Taoyuan (TW); Shuai Wu, Taoyuan (TW); Ran Liu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 123 days.

(21) Appl. No.: 17/229,364

(22) Filed: Apr. 13, 2021

(65) Prior Publication Data

US 2022/0181962 A1 Jun. 9, 2022

(30) Foreign Application Priority Data

Dec. 3, 2020 (CN) .......................... 202011403944.5

(51) Int. Cl.
*H02M 1/14* (2006.01)
*H02M 1/00* (2006.01)
*H02J 1/02* (2006.01)

(52) U.S. Cl.
CPC ............... *H02M 1/143* (2013.01); *H02J 1/02* (2013.01); *H02M 1/0009* (2021.05)

(58) Field of Classification Search
CPC ......... H02M 1/143; H02M 1/0009; H02J 1/02
See application file for complete search history.

(56) References Cited

U.S. PATENT DOCUMENTS

| 2011/0018515 A1* | 1/2011 | McCloy-Stevens ........................ H02M 3/1588 323/284 |
| 2013/0336025 A1* | 12/2013 | Figueroa ........... H02M 7/53871 363/37 |

FOREIGN PATENT DOCUMENTS

| CN | 103887824 A | 6/2014 |
| CN | 104078976 B | 8/2016 |

* cited by examiner

*Primary Examiner* — Kyle J Moody
(74) *Attorney, Agent, or Firm* — Kirton McConkie; Evan R. Witt

(57) ABSTRACT

A power quality compensator device and a control method thereof are provided. The power quality compensator device is electrically connected to a power grid and a nonlinear load, and includes a current controller, a converter, a ripple predictor, a processing unit and a voltage controller. The current controller is configured to receive an instruction current and output a switch control signal. The converter is configured to output an output current and an actual DC bus voltage according to the switch control signal. The ripple predictor is configured to receive an intermediate voltage and a first current and output a predicted ripple voltage. The processing unit is configured to output a processing result according to the actual DC bus voltage, the predicted ripple voltage and a reference DC bus voltage. The voltage controller is configured to receive the processing result and output a voltage control signal to the current controller.

25 Claims, 5 Drawing Sheets

POWER QUALITY COMPENSATOR DEVICE AND CONTROL METHOD THEREOF

CROSS-REFERENCE TO RELATED APPLICATION

This application claims priority to China Patent Application No. 202011403944.5, filed on Dec. 3, 2020. The entire contents of the above-mentioned patent applications are incorporated herein by reference for all purposes.

FIELD OF THE INVENTION

The present disclosure relates to a power quality compensator device and a control method thereof, and more particularly to a power quality compensator device and control method thereof which can compensate harmonic component and reactive component of power grid current.

BACKGROUND OF THE INVENTION

In electronic application, as the numbers of the nonlinear loads connected to the power grid increase, the harmonic component and reactive component caused by the nonlinear loads would affect the power quality of the power grid current. Further, the electronic devices connected to the power grid may be damaged. Conventionally, the APF (active power filter) or the SVG (static var generator) is utilized to compensate the harmonic component and reactive component of the power grid current caused by the nonlinear loads, which can improve the power quality of the power grid current.

Generally, the APF or the SVG is configured to detect the harmonic component and reactive component of the nonlinear loads current (or the power grid current) and output the compensation current having the same magnitude and the opposite direction compared with the harmonic component and reactive component. The compensation current is injected into the power grid which can make the harmonic component and reactive component of the power grid current approach to zero and improve the quality of the power grid current. In order to compensate the harmonic component and reactive component of the power grid current, the control method of a double-loop including a voltage outer loop and a current inner loop is applied in the APF or the SVG. The current inner loop is utilized to make the output current of the power quality compensator device track the instruction current. The voltage outer loop is utilized to ensure the average value of bus voltage of the power quality compensator device to be stabilized within a specific range. For ensuring the average value of the bus voltage to be stable, the bus voltage is usually sampled and low-frequency-passed filtered, and the bandwidth of the voltage outer loop is very low. Therefore, the problems such as the lower response speed of the voltage outer loop, the larger fluctuation of the bus voltage, and the fluctuation of the bus voltage exceeding the protection threshold are caused.

Therefore, it is necessary to provide a power quality compensator device and a control method thereof to obviate the drawbacks encountered from the prior arts.

SUMMARY OF THE INVENTION

In order to realize the present disclosure, there is provided a power quality compensator device electrically connected to a power grid and a nonlinear load. The power quality compensator device includes a current controller, a converter, a ripple predictor, a processing unit and a voltage controller. The current controller is configured to receive an instruction current and output a switch control signal. The converter is electrically coupled to the current controller, and the converter is configured to output an output current and an actual DC bus voltage according to the control signal. The ripple predictor is configured to receive an intermediate voltage and a first current and output a predicted ripple voltage. The intermediate voltage is a voltage at a common node of the power grid and the nonlinear load. The processing unit is electrically connected to the ripple predictor and the converter. The processing unit is configured to output a processing result according to the actual DC bus voltage, the predicted ripple voltage and a reference DC bus voltage. The voltage controller is electrically coupled to the processing unit and the current controller. The voltage controller is configured to receive the processing result and output a voltage control signal to the current controller.

In order to realize the present disclosure, there is further provided a control method configured to control a power quality compensator device. The power quality compensator device is electrically connected to a power grid and a nonlinear load. The control method includes: receiving an instruction current and outputting a switch control signal by a current controller; outputting an output current and an actual DC bus voltage according to the switch control signal by a converter; outputting a predicted ripple voltage according to an intermediate voltage and a first current by a ripple predictor, wherein the intermediate voltage is a voltage at a common node of the power grid and the nonlinear loads; outputting a processing result according to the actual DC bus voltage, the predicted ripple voltage and a reference DC bus voltage by a processing unit; and outputting a voltage control signal to the current controller according to the processing result by a voltage controller.

DETAILED DESCRIPTION OF THE EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
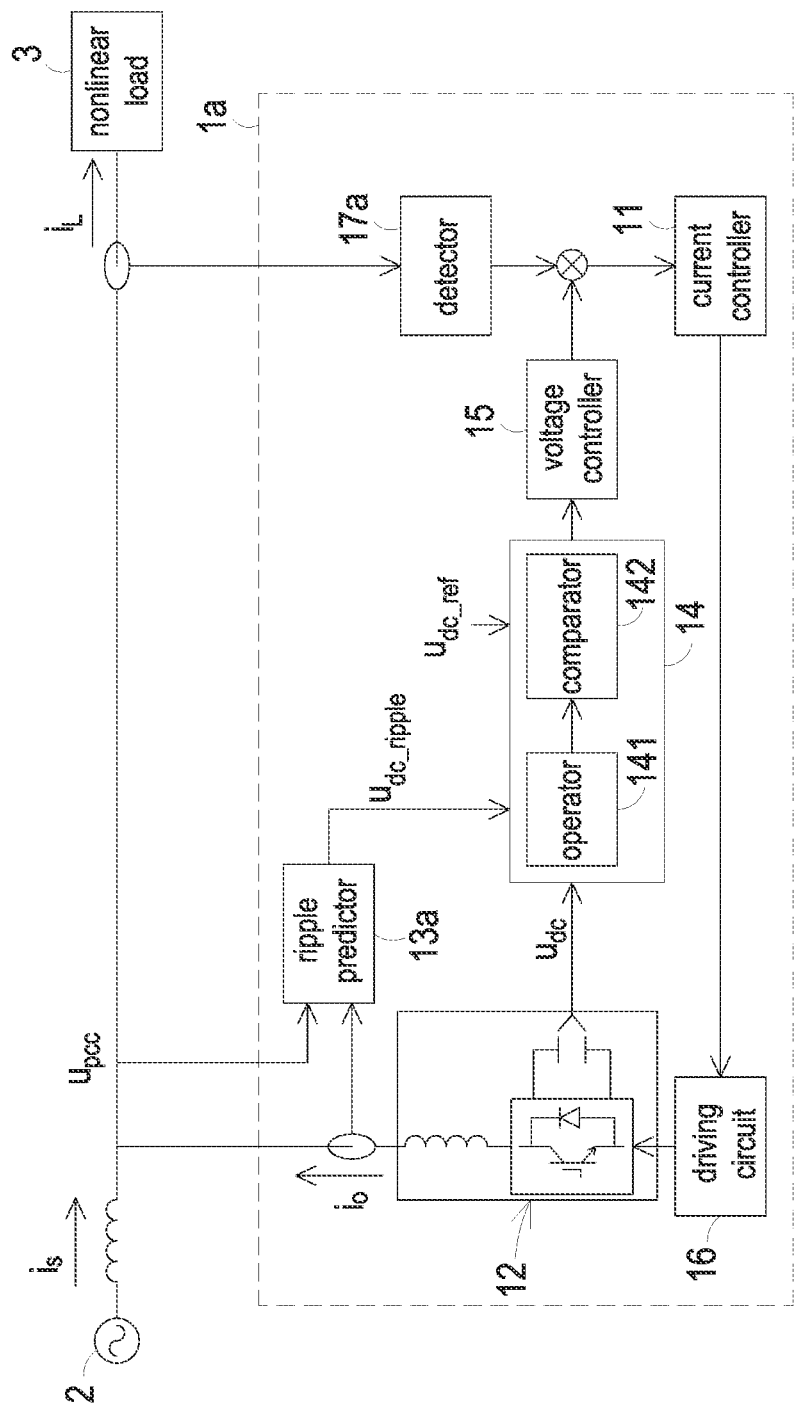
FIG. 1 is a schematic block diagram illustrating a power quality compensator device according to a first embodiment of the present disclosure.

FIG. 1 is a schematic block diagram illustrating a power quality compensator device according to a first embodiment of the present disclosure. As shown in FIG. 1, the power quality compensator device 1a is electrically connected to a power grid 2 and a nonlinear load 3, and the power quality compensator device 1a includes a current controller 11, a converter 12, a ripple predictor 13a, a processing unit 14 and a voltage controller 15. The power quality compensator device 1a is for example but not limited to an active power filter, a static var generator or an enhanced static var generator with harmonic compensation function. The current controller 11 is configured to receive an instruction current and output a switch control signal. The converter 12 is electrically coupled to the current controller 11 and is configured to receive the switch control signal. The converter 12 is configured to output an output current $i_o$ and an actual DC bus voltage $u_{dc}$ according to the switch control signal. The ripple predictor 13a is configured to receive an intermediate voltage $u_{pcc}$ and a first current, and output a predicted ripple voltage $u_{dc\_ripple}$ accordingly. The intermediate voltage $u_{pcc}$ is a voltage at a common node of the power grid 2 and the nonlinear load 3. The processing unit 14 is electrically connected to the ripple predictor 13a and the converter 12 for receiving the predicted ripple voltage $u_{dc\_ripple}$ and the actual DC bus voltage $u_{dc}$. The processing unit 14 further is configured to receive a reference DC bus voltage $u_{dc\_ref}$. According to the actual DC bus voltage $u_{dc}$, the predicted ripple voltage $u_{dc\_ripple}$ and the reference DC bus voltage $u_{dc\_ref}$, the processing unit 14 is configured to output a processing result. The voltage controller 15 is electrically coupled to the processing unit 14 and the current controller 11. The voltage controller 15 is configured to receive the processing result and output a voltage control signal to the current controller 11. When the power quality compensator device 1a compensates the harmonic component and reactive component of the power grid current is caused by the nonlinear load 3, a ripple component of the bus voltage is generated in the converter 12. According to the intermediate voltage $u_{pcc}$ and the first current, the ripple predictor 13a is configured to predict the ripple component of the bus voltage as the predicted ripple voltage $u_{dc\_ripple}$. In particular, the predicted ripple voltage $u_{dc\_ripple}$ reflects the ripple component of the actual DC bus voltage $u_{dc}$. Thereby, the processing unit 14 is configured to compare the actual DC bus voltage $u_{dc}$ (with the ripple component being removed) with the reference DC bus voltage $u_{dc\_ref}$ and output the processing result accordingly. The voltage controller 15 and the current controller 11 control the operation of the converter 12 according to the processing result. Consequently, the power quality compensator device 1a of the present disclosure can adopt the higher wide-bandwidth voltage control loop, the response speed of the voltage loop is much faster, and the control result for the bus voltage is more optimized. Further, the stability of the power quality compensator device 1a is improved, while the power quality of the power grid current is doesn't have side-effect.

The actual implementation of the ripple predictor predicting the ripple is exemplified as follows. The value of the bus capacitance in the converter 12 is C. The output current $i_o$ is selected as the first current, and the bus capacitor voltage at the initial moment is $U_0$. After a period of time t, since the energy is exchanged between the power quality compensator device and the power grid 2, the bus capacitor voltage is $U_0+\Delta U$, where $\Delta U$ is the ripple voltage. According to the law of conservation of energy, the following equation (1) is achieved.

$$\frac{1}{2}C(U_0+\Delta U)^2 - \frac{1}{2}CU_0^2 = \int_0^t u_{pcc} \cdot i_o dt \qquad (1)$$

By simplifying the equation (1), equation (2) is achieved.

$$\frac{1}{2}C(2U_0\Delta U + \Delta U^2) = \int_0^t u_{pcc} \cdot i_o dt \qquad (2)$$

Since $\Delta U$ is much less than $U_0$, the $\Delta U^2$ in equation (2) can be ignored to simplify, and the predicted ripple voltage $\Delta U$ is achieved as equation (3).

$$\Delta U \approx \frac{\int_0^t u_{pcc} \cdot i_o dt}{CU_0} \qquad (3)$$

In the equation (3), the intermediate voltage $u_{pcc}$ is a voltage at the common node of the power grid 2 and the nonlinear load 3. Thereby, according to the intermediate voltage $u_{pcc}$ and the first current (the output current $i_o$), the ripple component of the bus voltage can be predicted.

In an embodiment, the processing unit 14 includes an operator 141 and a comparator 142. The operator 141 is electrically connected to the ripple predictor 13a and the converter 12. The operator 141 is configured to receive the actual DC bus voltage $u_{dc}$ and the predicted ripple voltage $u_{dc\_ripple}$, calculate a difference between the actual DC bus voltage $u_{dc}$ and the predicted ripple voltage $u_{dc\_ripple}$, and output the difference to the comparator 142. The comparator 142 is electrically connected between the operator 141 and the voltage controller 15. The comparator 142 is configured to receive the difference, compare the difference with the reference DC bus voltage $u_{dc\_ref}$, and output the processing result.

In an embodiment, the power quality compensator device 1a further includes a driving circuit 16. The driving circuit 16 electrically connected between the current controller 11 and the converter 12. The driving circuit 16 is configured to receive the switch control signal outputted by the current controller 11. According to the switch control signal, the driving circuit 16 is configured to output a driving signal to the converter 12. The converter 12 operates according to the driving signal.

Figure 2:
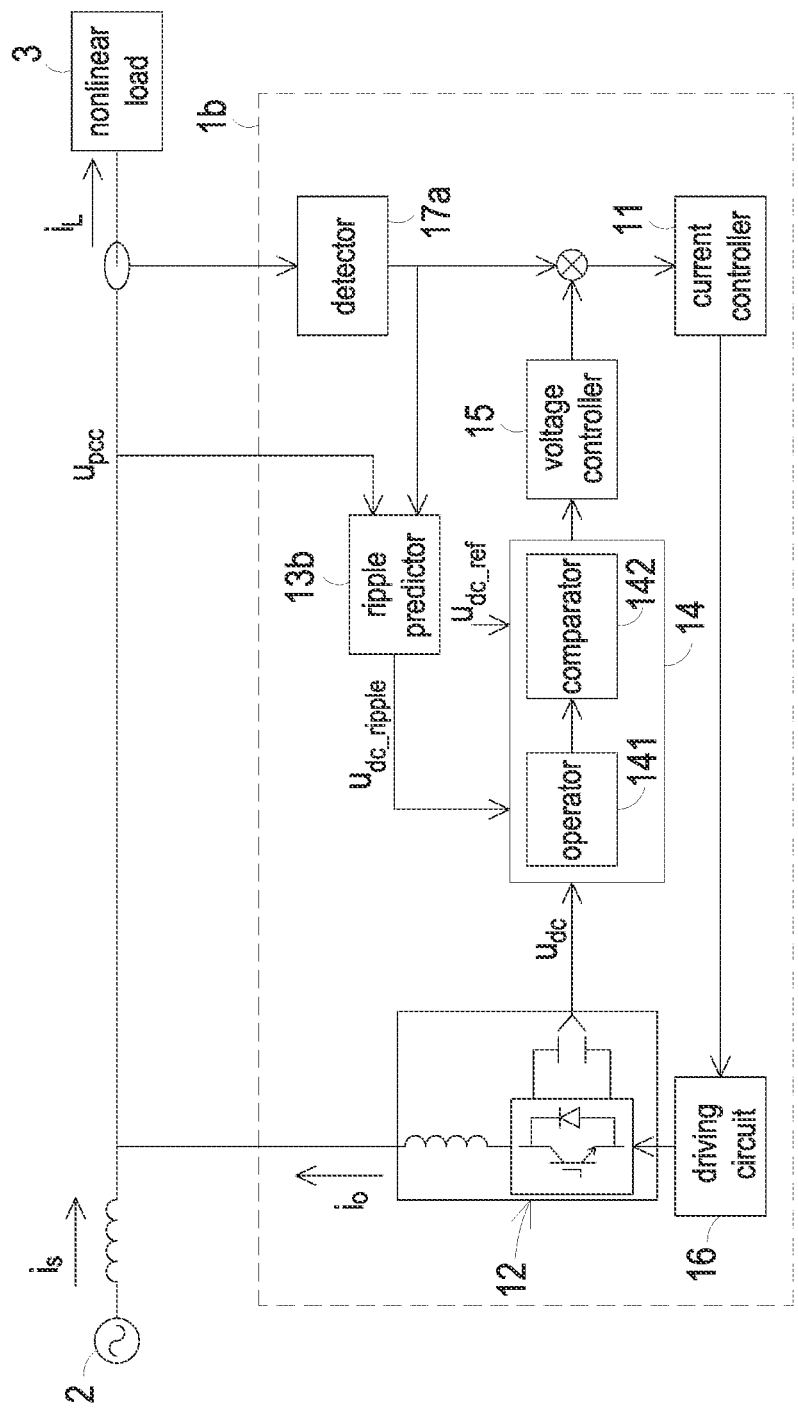
FIG. 2 is a schematic block diagram illustrating a power quality compensator device according to a second embodiment of the present disclosure.
Figure 3:
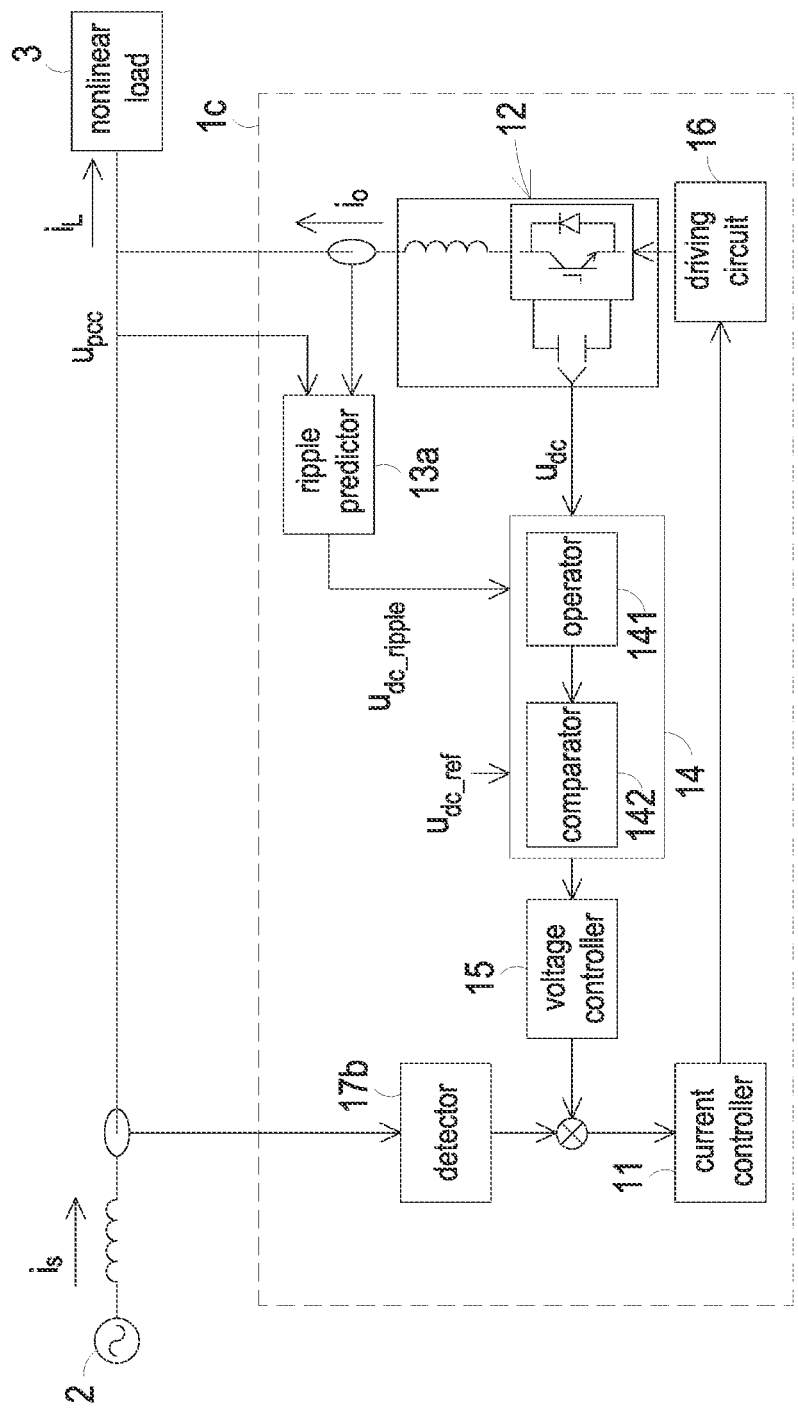
FIG. 3 is a schematic block diagram illustrating a power quality compensator device according to a third embodiment of the present disclosure.

In addition, in the first and third embodiments shown in FIG. 1 and FIG. 3 respectively, the output current $i_o$ is selected as the first current, and the ripple predictor 13a of the power quality compensator device 1a or 1c is configured to output the predicted ripple voltage $u_{dc\_ripple}$ according to the intermediate voltage $u_{pcc}$ and the output current $i_o$. However, in some other embodiments, such as the second and fourth embodiments shown in FIG. 2 and FIG. 4 respectively, the instruction current is selected as the first current, and the ripple predictor 13b of the power quality compensator device 1b or 1d is configured to output the predicted ripple voltage $u_{dc\_ripple}$ according to the intermediate voltage $u_{pcc}$ and the instruction current.

Figure 4:
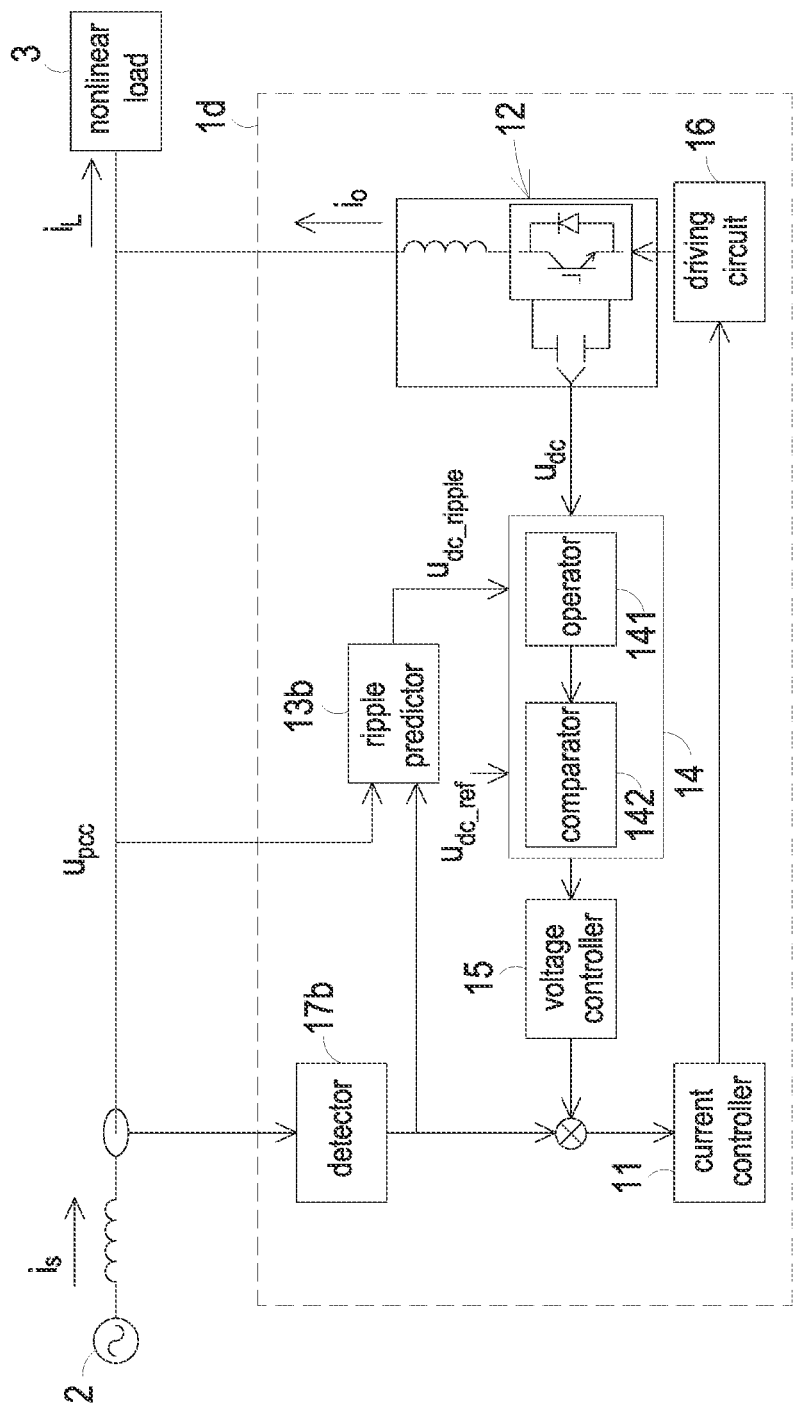
FIG. 4 is a schematic block diagram illustrating a power quality compensator device according to a fourth embodiment of the present disclosure.

Moreover, in the first and second embodiments shown in FIG. 1 and FIG. 2 respectively, a reference current of the nonlinear load current $i_L$ is selected as the instruction current. However, in some other embodiments, such as the third and fourth embodiments shown in FIG. 3 and FIG. 4 respectively, a reference current of the power grid current $i_s$ is selected as the instruction current. FIG. 3 shows the situation that the output current $i_o$ is selected as the first current, and FIG. 4 shows the situation that the instruction current is selected as the first current. In FIGS. 1-4, the components designated by the same numeral reference have similar structure and function, and thus the detailed descriptions of those components in FIGS. 2-4 are omitted herein.

In addition, in the first and second embodiments shown in FIG. 1 and FIG. 2 respectively, the power quality compensator devices 1a and 1b further include a detector 17a. The detector 17a is electrically connected to the current controller 11. The detector 17a is configured to detect a fundamental positive-sequence component, a fundamental negative-sequence component, a fundamental zero-sequence component and a harmonic component of the nonlinear load current $i_L$. According to the detection result, the detector 17a is configured to output the instruction current to the current controller 11. In the third and fourth embodiments shown in FIG. 3 and FIG. 4 respectively, the power quality compensator devices 1c and 1d further include a detector 17b. The detector 17b is electrically connected to the current controller 11. The detector 17b is configured to detect a fundamental positive-sequence component, a fundamental negative-sequence component, a fundamental zero-sequence component and a harmonic component of the power grid current $i_s$. According to the detection result, the detector 17b is configured to output the instruction current to the current controller 11.

Figure 5:
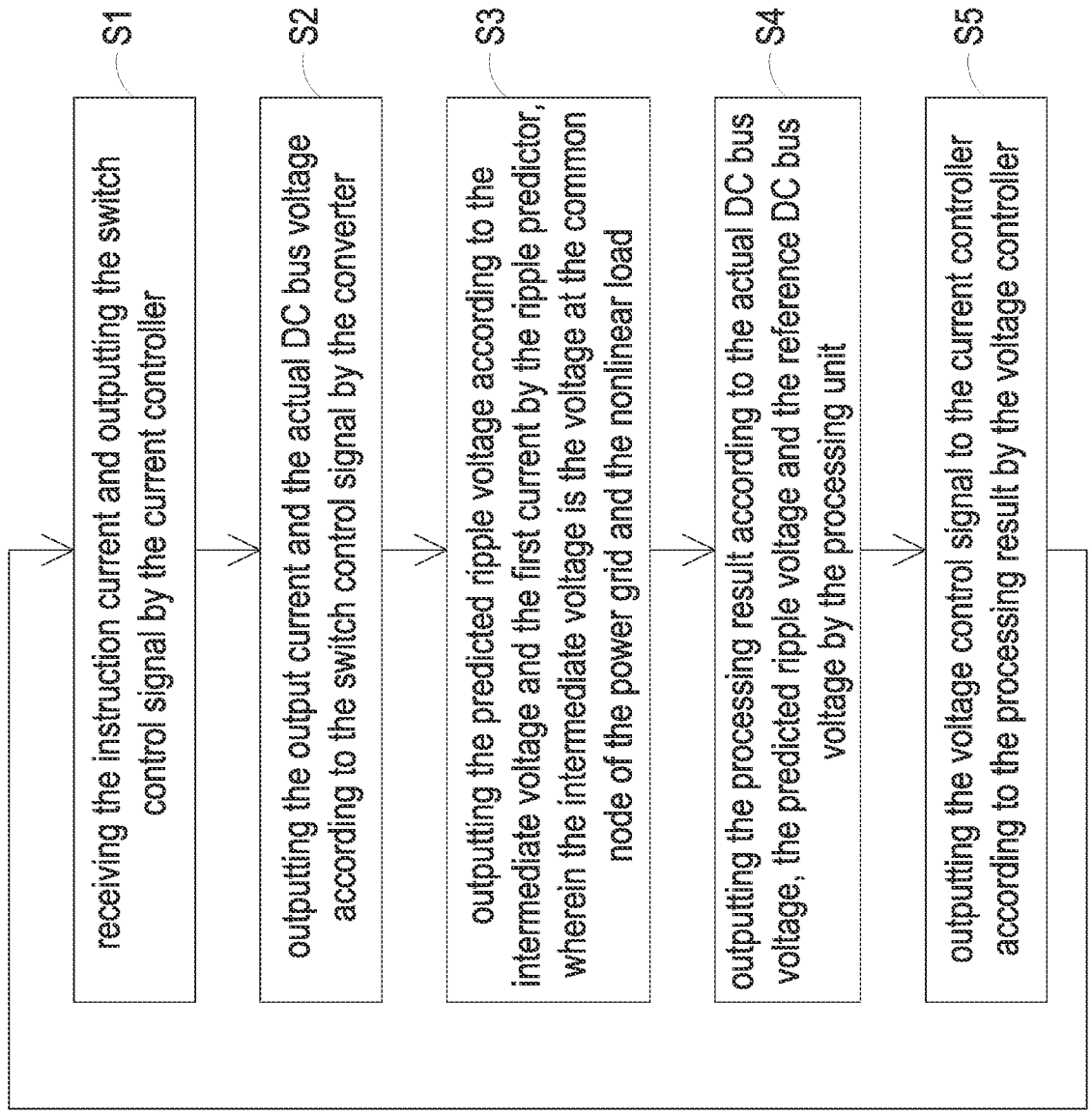
FIG. 5 is a schematic flow chart illustrating a control method according to an embodiment of the present disclosure.

FIG. 5 is a schematic flow chart illustrating a control method according to an embodiment of the present disclosure. The control method can be applied to the power quality compensator device of the above embodiments. As shown in FIG. 5, the control method includes steps S1, S2, S3, S4 and S5.

The step S1 is, receiving the instruction current and outputting the switch control signal by the current controller 11.

The step S2 is, outputting the output current $i_o$ and the actual DC bus voltage $u_{dc}$ according to the switch control signal by the converter 12.

The step S3 is, outputting the predicted ripple voltage $u_{dc\_ripple}$ according to the intermediate voltage $u_{pcc}$ and the first current by the ripple predictor 13a or 13b, wherein the intermediate voltage $u_{pcc}$ is the voltage at the common node of the power grid 2 and the nonlinear load 3.

The step S4 is, outputting the processing result according to the actual DC bus voltage $u_{dc}$, the predicted ripple voltage $u_{dc\_ripple}$ and the reference DC bus voltage $u_{dc\_ref}$ by the processing unit 14.

The step S5 is, outputting the voltage control signal to the current controller 11 according to the processing result by the voltage controller 15.

It is noted that the steps S1 to S5 can be performed circularly. Further, when starting to perform the control method, any of the steps S1 to S5 can be the initial step.

In an embodiment, the control method further includes: outputting the driving signal to the converter 12 according to the switch control signal by the driving circuit 16. The converter 12 operates according to the driving signal.

In this control method, the output current $i_o$ or the instruction current may be selected as the first current, and the reference current of the power grid current is or the nonlinear load current $i_L$ may be selected as the instruction current.

In addition, when the control method is applied to control the power quality compensator devices 1a and 1b shown in FIG. 1 and FIG. 2, the control method further includes: detecting the fundamental positive-sequence component, the fundamental negative-sequence component, the fundamental wae zero-sequence component and the harmonic component of the nonlinear load current $i_L$ and outputting the instruction current to the current controller 11 according to the detection result by the detector 17a. When the control method is applied to control the power quality compensator devices 1c and 1d shown in FIG. 3 and FIG. 4, the control method further includes: detecting the fundamental positive-sequence component, the fundamental negative-sequence component, the fundamental zero-sequence component and the harmonic component of the power grid current $i_s$ and outputting the instruction current to the current controller 11 according to the detection result by the detector 17b.

For the power quality compensator device controlled by the control method of the present disclosure, the power quality compensator device is for example but not limited to an active power filter, a static var generator or an enhanced static var generator with harmonic compensation function.

From the above descriptions, the present disclosure provides a power quality compensator device and a control method thereof. When the power quality compensator device compensates the harmonic component and reactive component of the power grid current caused by the nonlinear load, the ripple component of the bus voltage is predicted according to the first current and the voltage at the common node of the power grid and the nonlinear load. The ripple component of the actual DC bus voltage is compensated by the predicted ripple voltage, and thus the actual DC component of the DC bus voltage is achieved and the average value of the bus voltage is stable. Consequently, the power quality compensator device of the present disclosure can adopt the higher wide-bandwidth voltage control loop, the response speed of the voltage loop is much faster, and the control result for the bus voltage is more optimized. Further, the stability of the power quality compensator device is improved, while the power quality of the power grid current doesn't have side-effect.

While the disclosure has been described in terms of what is presently considered to be the most practical and preferred embodiments, it is to be understood that the disclosure needs not be limited to the disclosed embodiment.

What is claimed is:

1. A power quality compensator device, electrically connected to a power grid and a nonlinear load, comprising:
    a current controller configured to receive an instruction current and output a switch control signal;
    a converter electrically coupled to the current controller, wherein the converter is configured to output an output current and an actual DC bus voltage according to the switch control signal;
    a ripple predictor configured to receive an intermediate voltage and a first current and output a predicted ripple voltage, wherein the intermediate voltage is a voltage at a common node of the power grid and the nonlinear load;
    a processing unit electrically connected to the ripple predictor and the converter, wherein the processing unit is configured to output a processing result according to the actual DC bus voltage, the predicted ripple voltage and a reference DC bus voltage; and
    a voltage controller electrically coupled to the processing unit and the current controller, wherein the voltage controller is configured to receive the processing result and output a voltage control signal to the current controller.

2. The power quality compensator device according to claim 1, wherein the output current is selected as the first current, and the ripple predictor is configured to output the predicted ripple voltage according to the intermediate voltage and the output current.

3. The power quality compensator device according to claim 2, wherein a reference current of a current of the power grid is selected as the instruction current.

4. The power quality compensator device according to claim 3, further comprising a detector electrically connected to the current controller, wherein the detector is configured to detect a fundamental positive-sequence component, a fundamental negative-sequence component, a fundamental zero-sequence component and a harmonic component of the current of the power grid and output the instruction current to the current controller.

5. The power quality compensator device according to claim 2, wherein a reference current of a nonlinear load current is selected as the instruction current.

6. The power quality compensator device according to claim 5, further comprising a detector electrically connected to the current controller, wherein the detector is configured to detect a fundamental positive-sequence component, a fundamental negative-sequence component, a fundamental zero-sequence component and a harmonic component of the nonlinear load current and output the instruction current to the current controller.

7. The power quality compensator device according to claim 1, wherein the instruction current is selected as the first current, and the ripple predictor is configured to output the predicted ripple voltage according to the intermediate voltage and the instruction current.

8. The power quality compensator device according to claim 7, wherein a reference current of a current of the power grid is selected as the instruction current.

9. The power quality compensator device according to claim 8, further comprising a detector electrically connected to the current controller, wherein the detector is configured to detect a fundamental positive-sequence component, a fundamental negative-sequence component, a fundamental zero-sequence component and a harmonic component of the current of the power grid and output the instruction current to the current controller.

10. The power quality compensator device according to claim 7, wherein a reference current of a nonlinear load current is selected as the instruction current.

11. The power quality compensator device according to claim 10, further comprising a detector electrically connected to the current controller, wherein the detector is configured to detect a fundamental positive-sequence component, a fundamental negative-sequence component, a fundamental zero-sequence component and a harmonic component of the nonlinear load current and output the instruction current to the current controller.

12. The power quality compensator device according to claim 1, further comprising a driving circuit electrically connected between the current controller and the converter, wherein the driving circuit is configured to output a driving signal to the converter according to the switch control signal, and the converter operates according to the driving signal.

13. The power quality compensator device according to claim 1, wherein the power quality compensator device is an active power filter (APF), a static var generator (SVG) or an enhanced static var generator with harmonic compensation function.

14. A method for controlling a power quality compensator device electrically connected to a power grid and a nonlinear load, comprising:

receiving an instruction current and outputting a switch control signal by a current controller;
outputting an output current and an actual DC bus voltage according to the switch control signal by a converter;
outputting a predicted ripple voltage according to an intermediate voltage and a first current by a ripple predictor, wherein the intermediate voltage is a voltage at a common node of the power grid and the nonlinear load;
outputting a processing result according to the actual DC bus voltage, the predicted ripple voltage and a reference DC bus voltage by a processing unit; and
outputting a voltage control signal to the current controller according to the processing result by a voltage controller.

15. The method according to claim 14, wherein the output current is selected as the first current, and the ripple predictor is configured to output the predicted ripple voltage according to the intermediate voltage and the output current.

16. The method according to claim 15, wherein a reference current of a current of the power grid is selected as the instruction current.

17. The method according to claim 16, further comprising: detecting a fundamental positive-sequence component, a fundamental negative-sequence component, a fundamental zero-sequence component and a harmonic component of the current of the power grid and outputting the instruction current to the current controller by a detector.

18. The method according to claim 15, wherein a reference current of a nonlinear load current is selected as the instruction current.

19. The method according to claim 18, further comprising: detecting a fundamental positive-sequence component, a fundamental negative-sequence component, a fundamental zero-sequence component and a harmonic component of the nonlinear load current and outputting the instruction current to the current controller by a detector.

20. The method according to claim 14, wherein the instruction current is selected as the first current, and the ripple predictor is configured to output the predicted ripple voltage according to the intermediate voltage and the instruction current.

21. The method according to claim 20, wherein a reference current of a current of the power grid is selected as the instruction current.

22. The method according to claim 21, further comprising: detecting a fundamental positive-sequence component, a fundamental negative-sequence component, a fundamental zero-sequence component and a harmonic component of the current of the power grid and outputting the instruction current to the current controller by a detector.

23. The method according to claim 20, wherein a reference current of a nonlinear load current is selected as the instruction current.

24. The method according to claim 23, further comprising: detecting a fundamental positive-sequence component, a fundamental negative-sequence component, a fundamental zero-sequence component and a harmonic component of the nonlinear load current and outputting the instruction current to the current controller by a detector.

25. The method according to claim 14, further comprising: outputting a driving signal to the converter according to the switch control signal by a driving circuit, wherein the converter operates according to the driving signal.

* * * * *